Jan. 12, 1926. 1,569,139
E. A. PIGEON
CAMERA
Filed July 18, 1923 3 Sheets-Sheet 1

Inventor.
Ernest A. Pigeon
by J. H. McCrady
his Atty.

Jan. 12, 1926.
E. A. PIGEON
CAMERA
Filed July 18, 1923     3 Sheets-Sheet 3
1,569,139
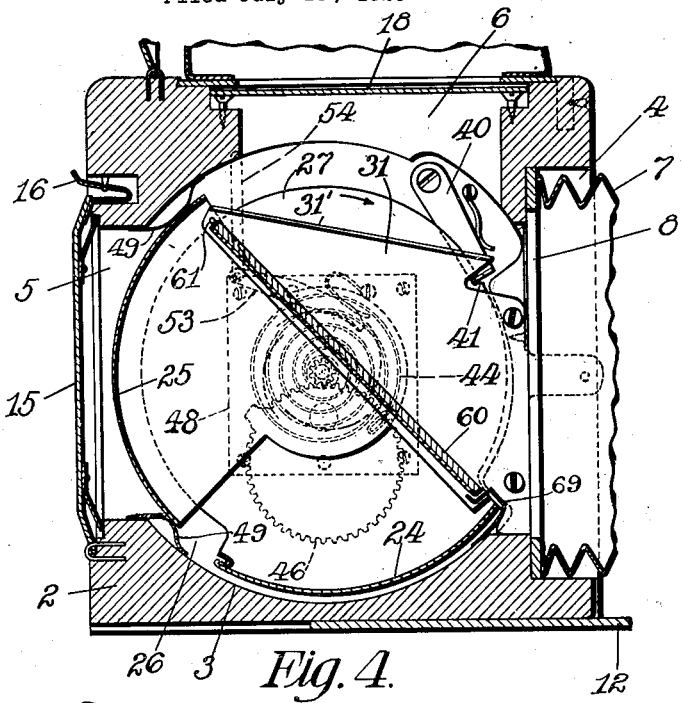
Fig. 4.
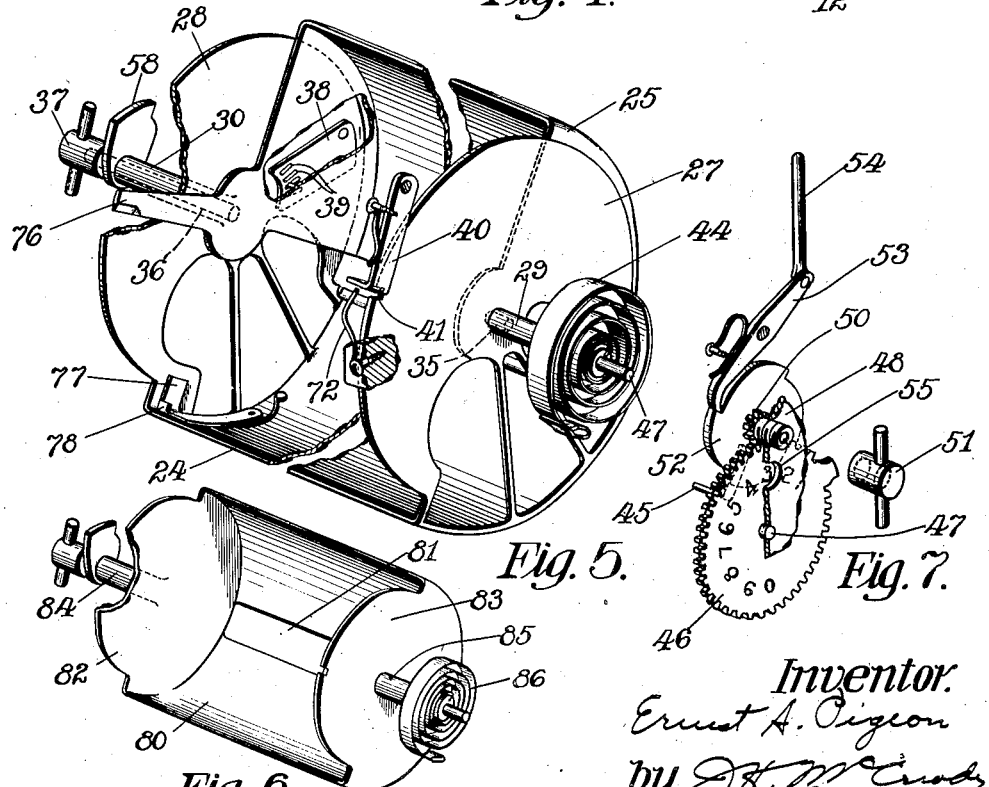
Fig. 5.      Fig. 7.
Fig. 6.
Inventor.
Ernest A. Pigeon
by J. H. McCrady
his Atty.

Patented Jan. 12, 1926.

1,569,139

UNITED STATES PATENT OFFICE.

ERNEST A. PIGEON, OF BEVERLY, MASSACHUSETTS.

CAMERA.

Application filed July 18, 1923. Serial No. 652,321.

*To all whom it may concern:*

Be it known that I, ERNEST A. PIGEON, a citizen of the United States, residing at Beverly, in the county of Essex and State of Massachusetts, have invented certain new and useful Improvements in Cameras, of which the following is a specification.

This invention relates to cameras, and is especially concerned with that type of camera of which the Graflex is a well known commercial example.

The advantages of cameras of this general type are well understood by those skilled in this art. Such cameras are, however, open to the objection that they are very expensive to manufacture, and the sale for them, consequently, is relatively limited. It is the chief object of the present invention, therefore, to devise a camera of this general type which, while possessing all the advantages of the present cameras of this character, will be much simpler in construction, more convenient to use and far more economical to manufacture. The invention is concerned especially with the shutter construction of this type of camera.

The nature of the invention will be readily understood from the following description when read in connection with the accompanying drawings, and the novel features are particularly pointed out by the appended claims.

In the drawings,

Fig. 4 is a cross sectional view through the box or body of the camera looking in the opposite direction to Fig. 3;

Fig. 5 is a broken perspective view of the shutter shown in Figs. 3 and 4;

Fig. 6 is a perspective view of another form of shutter;

Fig. 7 is a perspective view showing certain details of the operating mechanism of the shutter; and Figs. 8 and 9 are perspective views of portions of the shutter.

Figure 3:
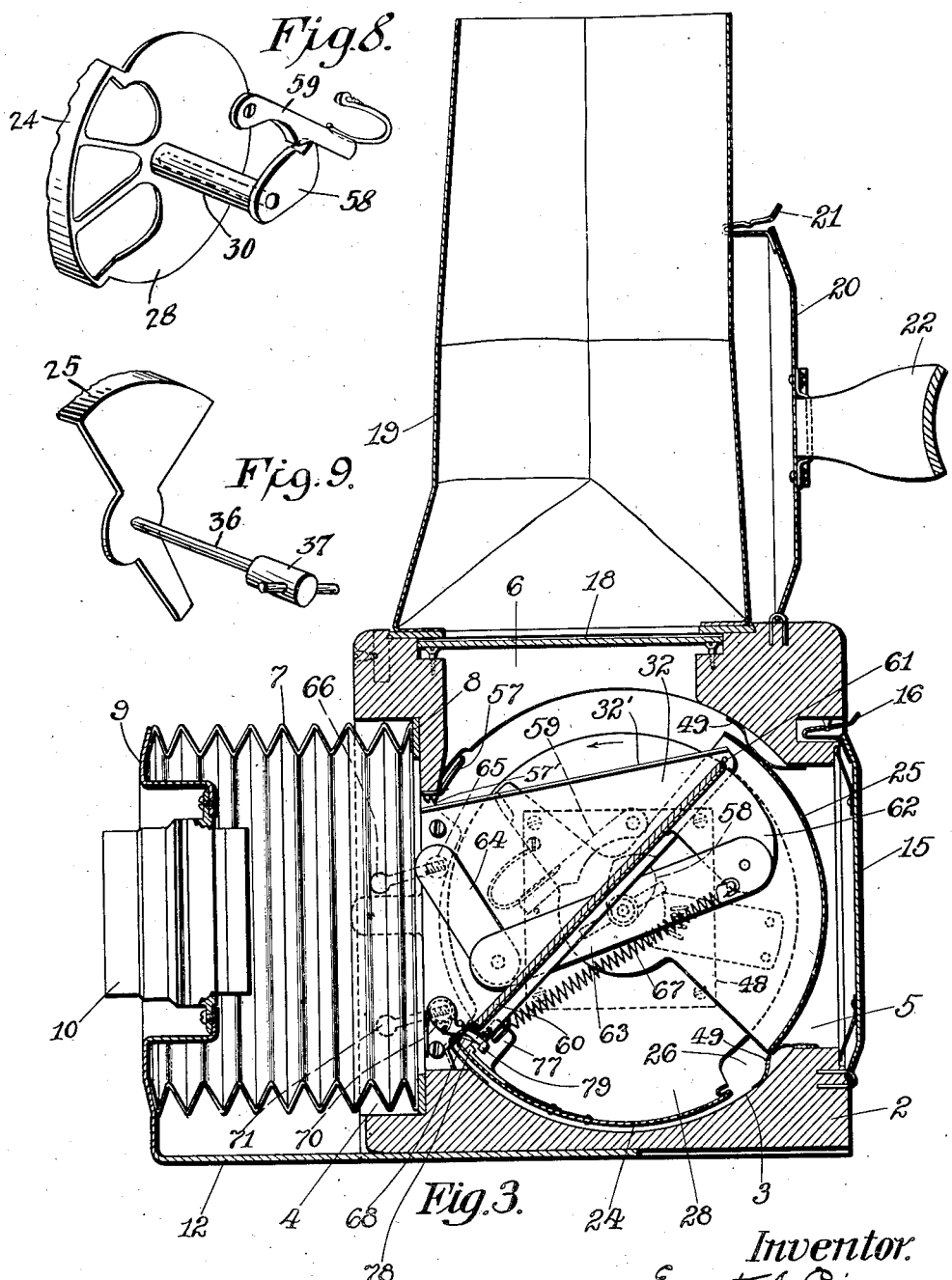
Fig. 3 is a vertical central cross sectional view of the camera, the plane of section lying substantially in the axis of the lens.

The construction shown comprises a camera box or body 2 provided with a central shutter chamber 3, Figs. 3 and 4, which is approximately cylindrical in form and has front, rear and top openings indicated at 4, 5 and 6, respectively, extending from said chamber. The front opening 4 receives a bellows 7 which is secured to a bellows board 8 and is connected at its forward end to a lens board 9 in which a lens 10 is mounted. A slide 12, integral with or rigidly secured to the lens board 9, is mounted in a dovetail groove formed in the bottom of the camera box 2 and supports said lens board for adjustment backward or forward.

At the back of the camera parts are arranged to support a film, film pack or plate, as desired, the particular construction shown being arranged to take a film, although it will be understood that any other form of sensitized surface may be substituted for the film and that the term "film" as used in the claims is intended to include plates, film packs, and the like.

Figure 2:
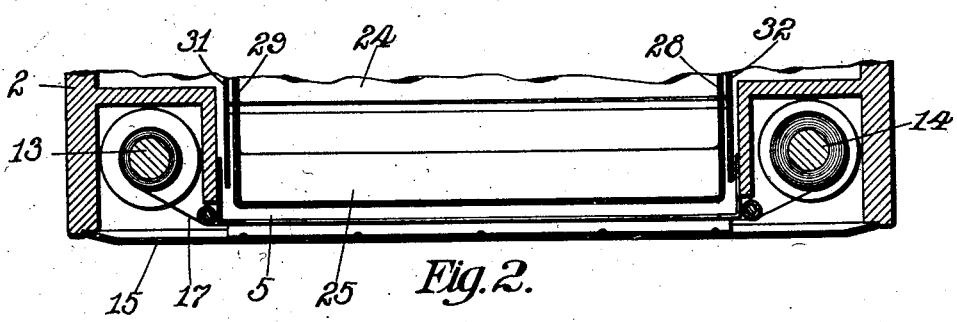
Fig. 2 is a horizontal cross sectional view through the film supporting mechanism and adjacent parts of the camera shown in Fig. 1.

Referring to Figs. 2 and 3, it will be seen that film reels 13 and 14 are mounted at the opposite ends of the opening 5, one being the winding reel and the other holding the supply of film. The film is stretched across the opening 5 and is guided in the usual manner, no special change in the usual film handling and guiding mechanisms being required for the purposes of this invention. Access to the film may be had through a hinged cover 15 which normally is held closed by spring latches 16.

A ground glass plate 18 is secured in the top of the box 2 across the opening 6 where it can be used for focusing purposes, and a hood 19 has its lower end attached to said box adjacent to the margin of the plate 18 and is arranged to be folded down compactly and enclosed under a hinged cover 20 which is held in its closed position by latches 21. A carrying strap or handle 22 is secured to this cover.

Figure 1:
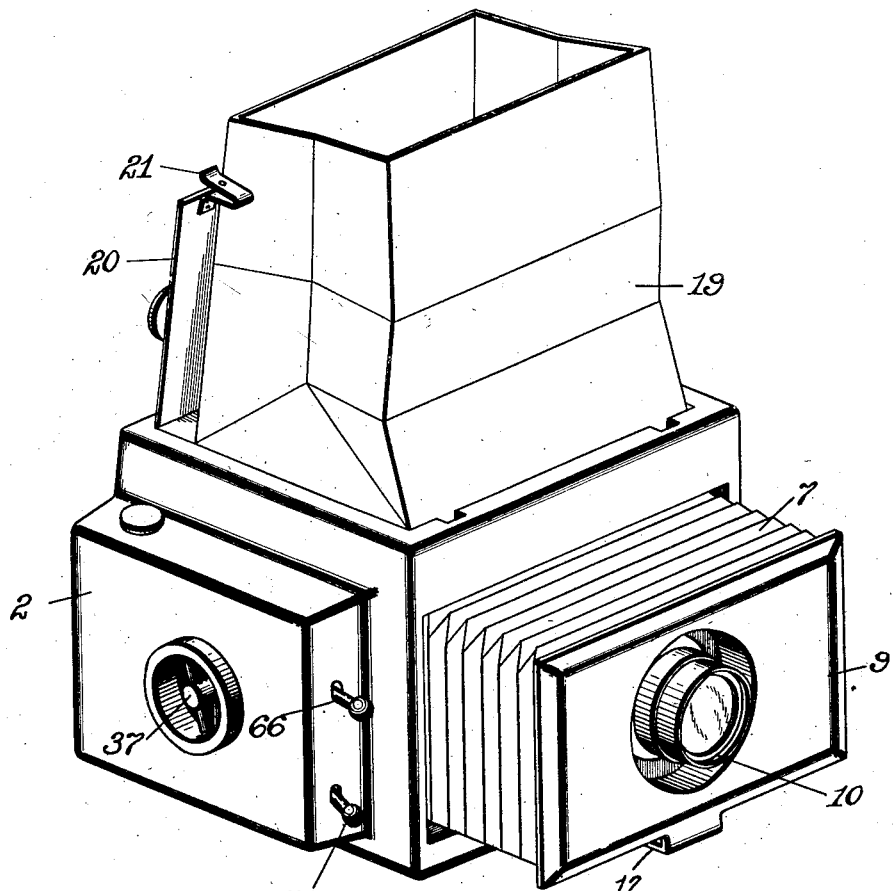
Figure 1 is a perspective view of a camera constructed in accordance with this invention.

The transmission of light from the lens 10 to the film 17 is controlled normally by a shutter which, as shown in Figs. 3, 4 and 5, consists of two sections 24 and 25. The shutter has the general form of a hollow cylindrical shell, cut away at one side, and provided with an exposure slot 26 in its opposite side. The section 24 has integral ends 27 and 28 with tubular shafts 29 and 30 projecting centrally therefrom and supporting the shutter for rotative movement. These shafts 29, 30 are mounted in stationary end plates 48, which are screwed to the camera box at opposite ends of the chamber 3. The two sections 24 and 25 of the shutter move in unison, but the section 25 may be adjusted relatively to the section 24 to vary the width of the slot 26. For this purpose the section 25 has pivot pins 35 and 36 secured to its opposite ends and mounted to rotate within the respective shafts 29 and 30. A thumb piece 37, Figs. 1, 8 and 9, is secured to the pivot pin 36, so that by turning said thumb piece the section 25 can be adjusted relatively to the section 24. For the purpose of holding these two parts in their adjusted relationship a plate 38, Fig. 5. is riveted to the end 28 of the section 24, and is provided with a series of depressions 39 adapted to receive a pin or projection extending from the end portion of the section 25, and thus to frictionally hold this section normally in a fixed relationship to its companion section.

The shutter is shown in Figs. 3 and 4 in its normal or closed position, and it is arranged to rotate in the direction indicated by the arrows in said figures for the purpose of making the exposure. This rotative movement is effected through a torsion spring, but the shutter normally is held against such rotation by a spring pressed latch 40, Figs. 4 and 5, which enters a notch 41 in the end 27 of the shutter. The torsion spring 44, Figs. 4 and 5, is coiled around the shaft 29 and has one end fastened thereto. Its other end is fastened to a pin 45, Fig. 7, which projects from an arm secured to a ratchet wheel 52. This wheel 52 rotates with a pinion 50 having a thumb piece 51 secured thereto for the purpose of turning it. Consequently, as the pinion 50 is turned it winds up the spring 44, and reverse rotation is prevented by the spring pressed pawl 53 engaging the ratchet wheel 52. A gear 46 meshes with the pinion 50 and is mounted to rotate loosely on a pin or shaft 47 which projects through the end plate 48 previously mentioned. The degree to which the spring 44 is tensioned is indicated by numerals on the face of the gear 46, these numerals being arranged to come successively in front of a window 55, Fig. 7, formed in the end plate 48. Leakage of light around the shutter is prevented by the presence of strips 49—49 of rubber, leather, or the like, which extend the entire length of the shutter and are secured at their edges to the camera box 2, but have central portions which are bowed or bulged and which rest lightly against said shutter. A plunger 54 which is pivoted to the rearward end of the pawl 53 projects upwardly through the wall of the camera box 2 so that its end may be depressed to release the pawl 53, if it should be desired to change the setting of the spring 44 for any reason.

It will now be understood that when the spring 44 has been tensioned and the latch 40 is released, the shutter will make a partial rotation in the direction indicated by the arrows in Figs. 3 and 4, and will make the exposure. This movement of the shutter is stopped partly by its engagement with two springs, one of which is shown at 57, Fig. 3. and partly by the contact of a cam 58, Figs. 5 and 8, with a spring pressed lever 59. This cam 58 is secured fast on the shutter shaft 30, and it engages the lever 29 just before the shutter completes its rotative movement. Abutments 57', Fig. 3, at each end of the shutter definitely limit its forward movement.

For the purpose of finding the image and focusing the camera, a mirror 60, Figs. 3 and 4, is mounted within the shutter to swing into either an operative or inoperative position. This mirror 60 is supported in metal frame which is hinged at its upper edge on pivots 61—61, these pivots being carried by the stationary plates 31 and 32. The mirror 60 is shown in Figs. 3 and 4 in its operative position, at an angle of substantially 45° to the axis of the lens, where it will reflect the beam of light transmitted through the lens on to the ground glass plate 18. For the purpose of moving the mirror 60 into this position, the mirror frame has an ear 62, Fig. 3, extending therefrom and connected by a link 63 to an arm 64 which is fastened to a horizontal rock shaft 65. A short hand lever or thumb piece 66, Figs. 1 and 3, is secured to the rock shaft 65 and projects through a slot in the camera box 2. Connected with the link 63 is a spring 67 which tends to swing the mirror 60 upwardly into an inoperative position where it lies against lips or flanges 31' and 32' formed on the upper edge of the stationary plates 31 and 32, respectively. In this position the mirror 60 is entirely out of the beam of light which is transmitted through the lens 10. By pushing the handle 66 downwardly, the mirror may be swung into its operative position, as shown in Figs. 3 and 4, where it completely cuts off the transmission of light through the box to the film 17.

The mirror 60 is locked in its operative position by a latch 68, Fig. 3, which is secured on the end of a horizontal rock shaft 70 having a handle 71 fastened to its opposite end and projecting through a slot in the casing, as clearly shown in Fig. 1. A spring coiled about the rock shaft 70 tends to hold the latch 68 in latching position. When the handle 71 is lifted the latch 68 is moved to release the mirror 60, whereupon the spring 67 immediately swings said mirror into its inoperative position.

This movement of the mirror 60 is utilized to release the latch 40 which holds the shutter, said latch being so positioned that it is struck by the mirror 60 just before the movement of the mirror is stopped by the lips or flanges 31' and 32'. This will be evident from an inspection of Fig. 4. A light spring 72, Fig. 5, is secured to the camera box 2 in position to engage the edge of the mirror 60 just before it strikes the lips 31' and 32' and stop it gradually.

It will now be understood that in using the camera the cap is removed from the lens 10, the cover 20 is swung into its open position, and the hood 19 is opened. The operator then depresses the end of the handle 66 to swing the mirror 60 into its operative position, as shown in Figs. 3 and 4, where it is caught and held by the latch 68. The handle or thumb piece 37 should also be moved to adjust the slot 26 to the desired width, provided such adjustment is necessary, and the thumb piece 51 should be turned also to wind up the spring 44 to the desired extent, the degree of tension thus imparted to said spring being indicated by the numeral in the window 55. It will be understood that the exposure will vary both with the width of the exposure slot 26 and also with the rate or speed at which this slot is moved past the film. Both of these factors can be adjusted. By looking into the hood 19 and moving the lens 10 backward or forward, the operator can properly focus the picture, and when the desired focus has been obtained he raises the handle 71, thus releasing the latch 68, whereupon the spring 67 immediately acts to swing the mirror 60 into its inoperative position. As the mirror 60 completes this movement it trips the latch 40 and the spring 44 immediately gives the shutter its rotative movement and makes the exposure. When this operation has been completed the section 24 of the shutter is interposed between the film 17 and the lens 10 and protects the film from light which otherwise would be transmitted to it.

Before the next exposure is made the mirror 60 should be returned to its operative position where it also acts to cut off any transmission of light to the film 17, and the shutter should then be returned to its original position, as shown in Figs. 3 and 4, by turning the handle 37 backwardly.

In order to make a time exposure the handle 37 should be turned until the section 25 is adjusted into a wide open position, the projection on the section 25 being moved entirely out of engagement with the notches 39. At this time the mirror 60 alone prevents the free transmission of light from the lens 10 to the film 17. Leakage of light under the lower edge of the mirror 60 is prevented by a strip 69 of metal, this strip being of angular cross section, as best shown in Fig. 4, and extending the entire length of said mirror. When the focusing operation has been completed, therefore, the operator presses the handle 71, thus releasing the mirror 60 and allowing it to swing into its inoperative position. This initiates the exposure. The movement of the section 25, as above described, however, has carried an arm 76, Fig. 5, behind a part 77 of a spring pressed latch which is pivoted to the section 24 and is provided with a lip 78. Normally this lip 78 is out of the path of the latch 68, but the arm 76 moves said latch forward or away from the end piece 28 so that when the latch 68 is released, a hook 79, Fig. 3, on the latch engages the lip 78 and catches it, thus preventing the section 24 from rotating when the latch 40 is released by the mirror 60. When an exposure of the desired length has been made, the operator releases the handle 71, thus moving the hook 79 of the latch 68 out of engagement with the lip 78 and allowing the spring 44 to rotate the shutter section 24 into position to cut off the light which strikes the film 17.

A simpler form of shutter designed for snap-shot work only is shown at 80 in Fig. 6. This shutter 80 is very much like that above described but is made in a single section. It includes a cylindrical shell, cut away at one side, and provided with a slot 81 in its opposite side. It also has ends 82 and 83 to which shafts 84 and 85, corresponding to the shafts 30 and 29, respectively, are connected. This shutter 80 is mounted and operated in substantially the same manner as the shutter previously described. The slot 81, however, is not adjustable in width, the timing of the exposure being effected simply by varying the tension of the spring 86, which corresponds to the spring 44 and is operated in the same manner.

It will now be appreciated that this invention provides a very simple form of camera which is simpler and more convenient to operate than the present cameras of the Graflex type and consequently is better suited to use by amateurs, although it may also be used for a wide variety of professional work. At the same time, this camera is far more economical to manufacture than prior constructions. While I have herein shown and described the best embodiment of my invention that I have so far devised, it will be understood that the invention is not limited to the embodiment in the form shown.

Having thus described my invention, what I desire to claim as new is:

1. In a camera comprising a camera box, a lens mounted in one side of said box, and means at the opposite side of said box for supporting a film, a shutter interposed between said lens and film and comprising a hollow cylindrical shell cut away at one side thereof and having an exposure slot through its opposite side, means supporting said shutter for rotative movement about an axis transverse to the axis of said lens, said shutter including a part adjustable to vary the width of said slot.

2. In a camera comprising a camera box, a lens mounted in one side of said box, and means at the opposite side of said box for supporting a film, a shutter interposed between said lens and film and comprising a hollow cylindrical shell cut away at one side thereof and having an exposure slot through its opposite side, means supporting said shutter for rotative movement about an axis transverse to the axis of said lens, said shutter comprising two sections relatively adjustable to vary the width of said slot, and means for frictionally holding said sections in adjusted relationship to each other.

3. In a camera comprising a camera box, a lens mounted in one side of said box, and means at the opposite side of said box for supporting a film, a shutter interposed between said lens and film and comprising a hollow cylindrical shell cut away at one side thereof, means supporting said shutter for rotative movement about an axis transverse to the axis of said lens, a spring mechanism for rotating said shutter, and releasable means for normally restraining the movement of said shutter.

4. In a camera comprising a camera box, a lens mounted in one side of said box, and means at the opposite side of said box for supporting a film, a shutter interposed between said lens and film and comprising a hollow cylindrical shell cut away at one side thereof, means supporting said shutter for rotative movement about an axis transverse to the axis of said lens, a spring mechanism for rotating said shutter, said mechanism being adjustable to rotate said shutter at different speeds as desired, and releasable means for normally restraining the movement of said shutter.

5. In a camera comprising a camera box, a lens mounted in one side of said box, and means at the opposite side of said box for supporting a film, a shutter interposed between said lens and film and comprising a hollow cylindrical shell cut away at one side thereof, shafts at the opposite ends of said shell supporting it for rotative movement about its axis, a torsion spring at one end of said shutter, gear mechanism for winding said spring, a pawl and ratchet for preventing the unwinding of the spring, said spring being connected with said shutter to rotate it, and a latch for normally holding said shutter against rotation by said spring.

6. In a camera comprising a camera box, a lens mounted in one side of said box, and means at the opposite side of said box for supporting a film, a shutter interposed between said lens and film and comprising a hollow cylindrical shell cut away at one side thereof, means supporting said shutter for rotative movement about an axis transverse to the axis of said lens, a spring mechanism for rotating said shutter, means for yieldingly arresting the rotative movement of said shutter, and releasable means for normally restraining the movement of said shutter.

7. In a camera comprising a camera box, a lens mounted in one side of said box, and means at the opposite side of said box for supporting a film, a shutter interposed between said lens and film and comprising a hollow cylindrical shell cut away at one side thereof and having an exposure slot through its opposite side, means supporting said shutter for rotative movement about an axis transverse to the axis of said lens, and a focusing mirror mounted within said shutter for movement into either an operative or inoperative position, and means for moving said mirror from one of said positions to another.

8. In a camera comprising a camera box, a lens mounted in one side of said box, and means at the opposite side of said box for supporting a film, a shutter interposed between said lens and film and comprising a hollow cylindrical shell partially cut away, means supporting said shutter for rotative movement, and a focusing mirror mounted within said shutter for swinging movement into either an operative or inoperative position.

9. In a camera comprising a camera box, a lens mounted in one side of said box, and means at the opposite side of said box for supporting a film, a shutter interposed between said lens and film and comprising a hollow cylindrical shell partially cut away, means supporting said shutter for rotative movement, a focusing mirror mounted within said shutter for movement into either an operative or inoperative position, and means arranged to be operated by the movement of said mirror for initiating the action of said shutter.

10. In a camera comprising a camera box, a lens mounted in one side of said box, and means at the opposite side of said box for supporting a film, a shutter interposed between said lens and film and comprising a hollow cylindrical shell partially cut away, means supporting said shutter for rotative movement, a focusing mirror mounted within said shutter, means supporting said mirror for movement into an operative or inoperative position, and a lever and link mechanism for moving said mirror from one of said positions to the other.

11. In a camera comprising a camera box, a lens mounted in one side of said box, and means at the opposite side of said box for supporting a film, a shutter interposed between said lens and film and comprising a hollow cylindrical shell partially cut away, means supporting said shutter for rotative movement, a focusing mirror mounted within said shutter, said mirror being pivoted for movement into either an operative or inoperative position, a spring connected with said mirror and tending to move it into an inoperative position, a handle operable from outside of said box, and connections between said handle and said mirror whereby the mirror may be swung into its operative position through a movement of said handle.

12. In a camera comprising a camera box, a lens mounted in one side of said box, and means at the opposite side of said box for supporting a film, a shutter interposed between said lens and film and comprising a hollow cylindrical shell partially cut away, means supporting said shutter for rotative movement, a focusing mirror mounted within said shutter, said mirror being pivoted for movement into either an operative or inoperative position, a spring connected with said mirror and tending to move it into an inoperative position, a latch for holding said mirror in its operative position against the action of said spring, means for releasing said latch, and means operable from a point outside of said box for swinging said mirror from an inoperative to an operative position.

13. In a camera comprising a camera box, a lens mounted in one side of said box, and means at the opposite side of said box for supporting a film, a shutter interposed between said lens and film and comprising a hollow cylindrical shell cut away at one side thereof, means supporting said shutter for rotative movement about an axis transverse to the axis of said lens, a spring mechanism for rotating said shutter, a focusing mirror mounted within said shutter for movement in either an operative or inoperative position, and means whereby said mirror controls the action of said shutter.

14. In a camera comprising a camera box, a lens mounted in one side of said box, and means at the opposite side of said box for supporting a film, a shutter interposed between said lens and film and comprising a hollow cylindrical shell cut away at one side thereof, means supporting said shutter for rotative movement about an axis transverse to the axis of said lens, a spring mechanism for rotating said shutter, a latch normally restraining the movement of said shutter, a focusing mirror mounted within said shutter for movement into either an operative or inoperative position, a spring connected with said mirror and tending to move it into an inoperative position, means operable from the outside of said box for moving said mirror in the opposite direction, and a latch for holding said mirror normally in its operative position, said mirror being arranged to strike the latch which holds said shutter and release it as the mirror swings into its inoperative position.

15. In a camera comprising a camera box, a lens mounted in one side of said box, and means at the opposite side of said box for supporting a film, a shutter interposed between said lens and film and comprising a hollow cylindrical shell partially cut away, means supporting said shutter for rotative movement, a focusing mirror mounted within said shutter for swinging movement into either an operative or inoperative position, said mirror when in its operative position being arranged to prevent the transmission of light from said lens to said film.

16. In a camera comprising a camera box, a lens mounted in one side of said box, and means at the opposite side of said box for supporting a film, a shutter interposed between said lens and film and comprising a hollow cylindrical shell partially cut away, means supporting said shutter for rotative movement, a focusing mirror mounted within said shutter for swinging movement into either an operative or inoperative position, said mirror when in its operative position being arranged to prevent the transmission of light from said lens to said film, and selective means whereby the exposure may be initiated through either a movement of said shutter or said mirror, as desired.

17. In a camera comprising a camera box, a lens mounted in one side of said box, and means at the opposite side of said box for supporting a film, a shutter interposed between said lens and film and comprising a hollow cylindrical shell partially cut away, means supporting said shutter for rotative movement, a focusing mirror mounted within said shutter for swinging movement into either an operative or inoperative position, said mirror when in its operative position being arranged to prevent the transmission of light from said lens to said film, a spring for moving said mirror into its inoperative position, a latch for restraining the movement of said mirror by said spring, and means whereby said latch may be made operative or inoperative, as desired, to restrain the movement of said shutter.

ERNEST A. PIGEON.